Jan. 12, 1960 M. J. FIVEL 2,921,132

CODE CONVERTER

Filed Feb. 28, 1958 5 Sheets-Sheet 1

INVENTOR

MILTON J. FIVEL

BY

ATTORNEY

CODE CONVERTER

Filed Feb. 28, 1958

5 Sheets-Sheet 2

INVENTOR
MILTON J. FIVEL
[signature]
ATTORNEY

Jan. 12, 1960

M. J. FIVEL 2,921,132

CODE CONVERTER

Filed Feb. 28, 1958

5 Sheets-Sheet 3

INVENTOR
MILTON J. FIVEL

ATTORNEY

Jan. 12, 1960 M. J. FIVEL 2,921,132

CODE CONVERTER

Filed Feb. 28, 1958 5 Sheets-Sheet 4

INVENTOR
MILTON J. FIVEL

Max Wolf
ATTORNEY

Jan. 12, 1960 M. J. FIVEL 2,921,132

CODE CONVERTER

Filed Feb. 28, 1958 5 Sheets-Sheet 5

INVENTOR
MILTON J. FIVEL
BY Max Wall
ATTORNEY

United States Patent Office 2,921,132

Patented Jan. 12, 1960

2,921,132

CODE CONVERTER

Milton J. Fivel, Falls Church, Va., assignor, by mesne assignments, to Standard & Poor's Corporation, New York, N.Y., a corporation of New York Application February 28, 1958, Serial No. 718,372

13 Claims. (Cl. 178—26)

The present invention relates generally to systems for converting an $n$ digit code to an $m$ digit code, where $m$ and $n$ are different, and more particularly for reading $n$ digit coded material in a first tape and for generating an $m$ digit coded tape in response to the reading, where $2m=n$.

In a particular application of the present invention, a symmetrical six digit punched tape is fed to a tape reader, wherein the successive characters on the tape are converted into electrical impulses. The six digit tape employs so-called Western Union code. It is desired to convert the Western Union code to Datatron code, wherein three digits form a character. Moreover, the Datatron code requires that twelve lines or characters represent a word or frame. Of these twelve lines or characters, one represents a start signal and one a stop signal, leaving ten characters to represent information. Since ten three digit characters require thirty digits, the Western Union code is grouped in words of five characters, each comprised of six digits, and each Western Union character is read in two steps of three digits each, as two Datatron characters.

In order to affect the desired conversion to Datatron code, each Western Union character is converted to two Datatron characters, a reading of alternate halves of each Western Union characters being required in succession. The read-out or Datatron tape must, therefore, be fed two steps for each feed of one step of the read-in or Western Union tape, alternate halves of each Western Union character being read for each step of the Datatron tape.

In order to provide read-out of the Datatron code in synchronism with read-in of Western Union code resort is had to a master stepping switch, which controls both read-in and read-out, and which includes a total of thirteen positions. The master stepping switch controls a plurality of banks of slave stepping switch-banks. While the master stepping switch controls and synchronizes the operation of the entire system, by controlling the stepping switch banks, it is itself controlled in response to operation of a tape punch cam. Each punch or read-out operation is accompanied by one rotation of the tape-punch cam, which, at a predetermined angle of rotation, actuates a switch connected in series with the step magnet of the master stepping switch, supplying one stepping pulse to the latter. Each step of the master stepping switch, in turn, effects a further rotation of the tape punch cam, the alternate operations proceeding until a cycle of operation of the system has been completed, i.e., until a Western Union word has been converted to a Datatron word.

The repetitive read-in, read-out and tape feed appropriate to generation of each Datatron character, are synchronized from electrical signals generated by the stepping banks, which are in turn stepped in completion of each operation, so that each component can perform an operation only following completion of a preceding operation, and in rigorously timed relation thereto.

Synchronizing of individual operations of the system is performed by cams, which are driven by the same shafts which feed the read-in and read-out tapes. Similarly, actuated cams control the stepping switch-banks, which in turn time the operations of the drives for the cams and the tape feeds, as well as the punches. A time sequence is thus set up internally of the system for the various component operations carried out in a cycle of operations, each with respect to one another, rather than by allotting predetermined time intervals for complete cycles of operation, or for separate operations. In consequence, operation of the present system has proven completely reliable, over long time periods, and tape feed and punching has been smooth and free of tearing, bunching or the like.

Moreover, synchronization is essentially mechanical, rather than electrical, which enables adjustments to be expeditiously made, and eliminates uncertainties heretofore existing in electrically or electronically synchronized or time controlled code conversion systems.

Provision is made for automatic completion of read-in and read-out of any frame or word, once read-in thereof has been initiated, despite opening of a stop switch. Accordingly, the system cannot be closed down in the middle of a word, at least so long as power is supplied.

The Datatron coded tape which is produced by the system may be utilized to control computers. For that purpose each Datatron word must include a "start" code and a "stop" code, and each line of Datatron code must be accompanied by a clock or synchronizing digit or element. The present system is arranged to insert these automatically into the read-out tape.

Certain special computer control code words may be required to be inserted at will into the Datatron tape, independently of the read-in tape. Provision for insertion of one such word, in response to actuation of a control switch, is included in the system as herein described and illustrated.

It is, accordingly, an object of the present invention to provide a novel system of code conversion.

It is another object of the present invention to provide a system for converting words in Western Union code to words in Datatron code.

Still another object of the invention is to provide a novel tape to tape code converter, the read-out tape being provided with clock elements, start and stop code lines, and special words required to control a computer from the read-out tape.

Another object of the invention resides in the provision of a system for converting codes in a series of steps, by reading data from one tape to another, wherein each operation of the system is timed in response to completion of a preceding operation, the timing elements being cams and stepping switches each of which times operation of the other in completely interlocked relation.

The above and still further objects, features and advantages of the present invention will become apparent upon consideration of the following detailed description of one specific embodiment thereof, especially when taken in conjunction with the accompanying drawings, wherein.

Figures 1, 2, 3:
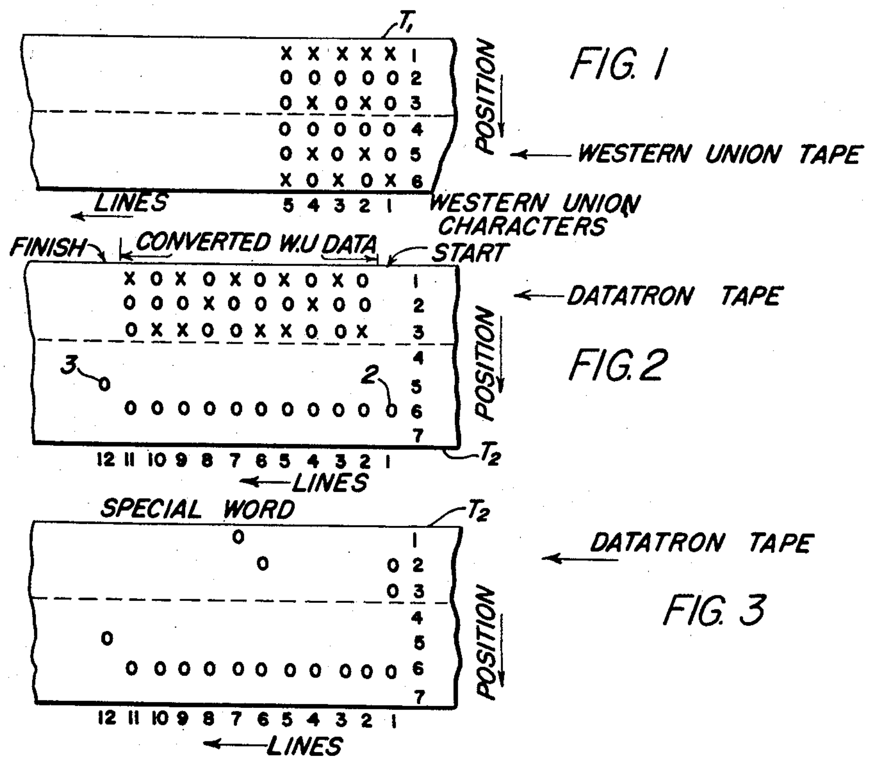
Figure 1 is a representation of a length of read-in tape having thereon a Western Union word.
Figure 2 is a representation of a length of read-out tape having thereon a Datatron word, including clock elements, and start and stop elements.
Figure 3 is a representation of a length of tape having thereon a special Datatron word, employed for computer control.

Proceeding now to describe a preferred embodiment of the invention, by reference to the accompanying drawings, the Western Union code depicted in Figure 1 is a code which employs six digits per line, taken transversely across a tape, TI, and employing five lines per word. The digits are identified by punched holes (*o*) or by absence of punched holes (*x*) at the various positions of each line.

The Datatron code, one frame of which is depicted in Figure 2 is a code which employs three digits per line, and is illustrated in the form of a punched tape T2.

To convert Western Union code to Datatron code the two halves of each line of Western Union code are read-out in sequence and punched as adjacent succeeding lines on the Datatron tape. The Datatron tape is employed to control a computer, and for this purpose each word or frame, comprising ten lines, is preceded by a "start" punch, 2, and succeeded by a Finish punch 3.

The Datatron tape utilizes five positions per line, positions #1, #2 and #3 representing converted data, position #4 being unused, position #5 being employed for a Finish punch, at line #12 of each frame, and position #6 being employed for a Start punch, at line #1 of each frame, and for Clock punches, at lines #2–#11 of each frame.

Provision is made for inserting a so-called "special word" in the read-out or Datatron tape at will, one such word being illustrated at Figure 3 of the accompanying drawings, and its character is obvious from the illustration, including Start, Stop and Clock punches, and "information" in the first three positions of each line. The "special word" code thus completely parallels code words formed by code conversion. Their utility in the present system is to insert commands into a computer.

Provision is also made automatically to finish any word conversion, once initiated, despite opening of a system Start switch.

Operation of the system is initiated by closing the start switch. The system then proceeds to convert Western Union to Datatron coded tape, and continues automatically until the Start switch is open. At this point the system automatically finishes the word it was in process of converting when the switch was opened, and thereafter terminates operation. Thereafter, a "special word" switch may be momentarily closed, and in response the system punches the special word, in Datatron code, into the read-out tape and again terminates operation.

Figure 5A:
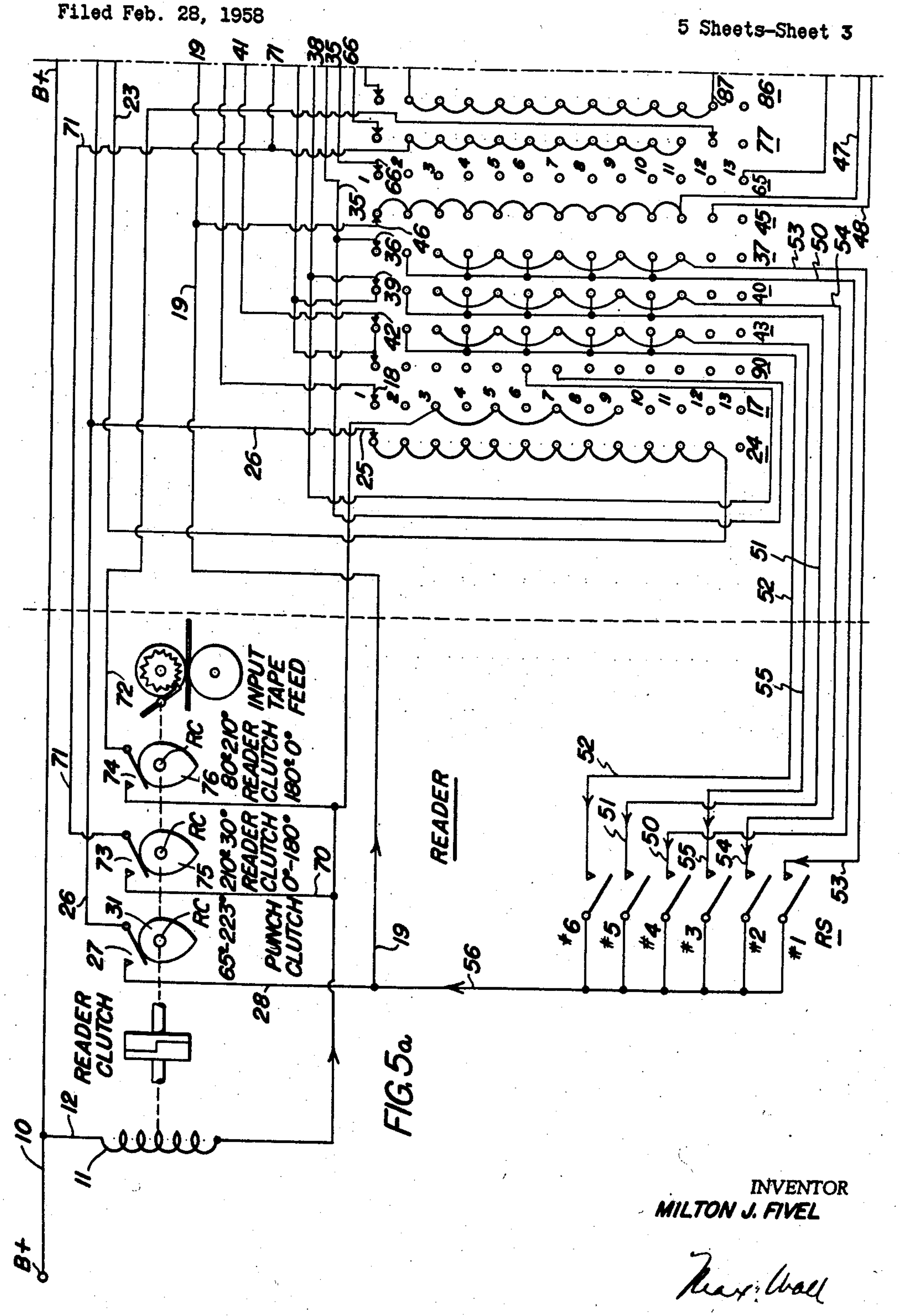
Figures 5a and 5b are schematic circuit diagrams of a tape-to-tape conversion system according to the invention.
Figure 5B:
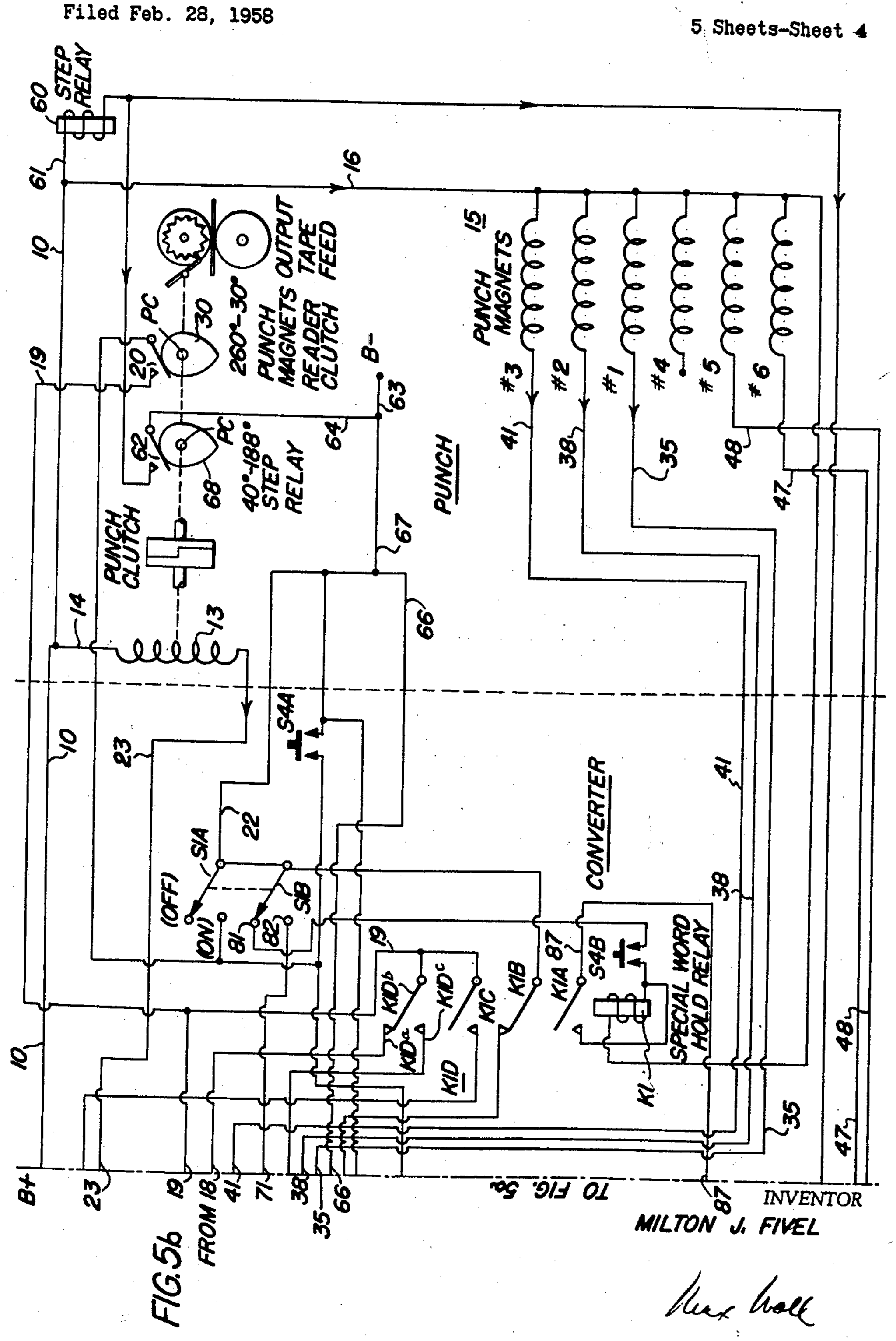

Referring now to the schematic circuit diagram of Figures 5*a* and 5*b* of the accompanying drawings, voltage is supplied from a B+ line 10, in parallel to a reader clutch 11 via line 12, to a punch clutch 13 via line 14, and to a bank of punch magnets 15 via a line 16. The reader clutch 11 is of the type which rotates 180° per energization. In the present system, the reader clutch has a 0° position when system operation is initiated, and rotates to 180° in response to closure of a start switch. Thereafter, the reader clutch circuitry is so arranged that each energization effects a 360° rotation, i.e., from 180° to 180°, and this occurs when lines #3, 5, 7 and 9 of the read-out tape are punched. When line #11 of the read-out tape is punched, the reader clutch is again constrained to advance only 180°, i.e., from 180° to 360°, which is its normal start position. The punch clutch 13 rotates 360° per energization, and when energized once, serves to feed a read-out tape one step or line, during the latter part of its rotation.

The circuit of reader clutch 11 proceeds to selected contacts of a bank of reader control contacts of a stepping switch bank 17. The latter includes a wiper 18, connected with the back contact K1D*a* of a relay operated switch K1D, the armature K1D*b*, and thence to a lead 19. The lead 19 proceeds through a punch cam controlled switch 20, and via On-Off switch S1A in its On position to B— power line 22. Those reader control contacts of the bank 17 which are connected with the reader clutch 11 are #3, #5, #7 and #9, the remaining contacts, i.e., #1, #2, #4, #6, #8, #10 to #13 being unconnected. As will appear hereinafter, the reader clutch magnet 11 step the read-in tape only for positions #3, #5, #7 and #9 of the reader control band 17, i.e., for the connected positions of the bank.

The punch clutch magnet 13 is connected from B+ line 10 via line 23 to selected contacts of a punch control stepping switch bank 24, having thirteen contacts and a wiper 25. Contacts #1 to #12, inclusive, are interconnected, and contact #13 is left unconnected. The read-out tape is fed one step for each step of the stepping switch bank 24 except the last, i.e., #13. The read-out tape is thus actuated twelve steps for each four steps of the read-in tape, in each cycle of operations of the system, when a cycle of operation is defined as including all the component operations required to convert one word.

The wiper 25 is connected via line 26, reader cam operated switch 27, and line 28 to line 19, which in turn proceeds to B— line 22 via punch cam operated switch 20.

Punch cam 30, which actuates switch 20, is not driven synchronously with reader cam 31, which actuates switch 27. Reader cams are driven by the reader clutch, 11, while punch cams are driven by the punch clutch 13. The latter rotates 360° for each energization, while the reader clutch 11 rotates, as hereinabove described, feeding the read-out tape during the second 180° of its rotation. The two cam rotations are synchronized only via the stepping switch banks 17 and 24.

In operation, the reader clutch when energized twice feeds the read-in tape one step, and after the read-in tape has been fed to its position, it is read, the read-out tape meanwhile remaining stationary. Sufficient time having been allowed for the feed of the read-in tape to the position in which it is read, the punches are operated to insert a line (in a manner hereinafter described) in the read-out tape, and only thereafter is the punch clutch magnet 13 energized to feed the read-out tape to a new position.

The punch magnets 15 are numbered 1 to 6, according to the arrangement of one of the several standard tape punch machines. Of these punch magnets, #4 is not used in the present system, and only #1, #2 and #3 are employed to punch converted data characters in the output tape. Punch magnet #1 proceeds via line 35 to the wiper 36 of a bank 37 of punch control contacts, thirteen in number. Punch magnet #2 proceeds via line 38 to wiper 39 of a bank 40 of punch control contacts, thirteen in number. Punch magnet #3 proceeds via line 41 to wiper 42 of a bank 43 of control contacts, thirteen in number. In each of banks 37, 40 and 43 contacts #1, #12 and #13 are not connected to the reader switches RS. Contacts #2, #4, #6, #8 and #10 of each bank are interconnected and connected to reader switches #4, 5, 6, and contacts #3, 5, 7, 9 and 11 of each bank are interconnected, and connected to reader switches #1, 2, 3.

A fourth bank of contacts 45 is provided, having a wiper 46 directly connected to line 19. Contacts #1 to 11 of bank 45 are interconnected, and all are connected via line 47 to punch magnet #6 of punches 15. Contact #12 is connected via line 48 to punch magnet #5 of punches 15; and contact #13 is blank.

Wiper 46, being connected directly to line 19, causes punch magnet #6 to be actuated when cam actuated switch 20 is closed. The latter is closed from 260° to 30° of rotation of punch clutch 13, and hence is closed at 0°, when punch clutch 13 is stationary.

In respect to banks 37, 40 and 43, contacts #2, 4, 6, 8, and 10 are connected to each of lines 50, 51, 52 respectively. Contacts #3, 5, 7, 9, 11 are connected to each of lines 53, 54, 55, respectively. Lines 53, 54, 55, 50, 51, 52 connect respectively with reader pins #1 to #6, shown in the form of switches RS. These are normally open, and are closed only in response to the presence of holes in the read-in tape, in a fashion which is per se conventional.

The reader switches RS are all directly connected with line 19, via line 56, and accordingly read-out signals are conveyed to punch magnets #1, #2 and #3 on each closure of cam actuated switch 20. However, read-in signals proceed from read-in switches #1, #2, and #3 and #4, #5, #6, on alternate contacts of banks 37, 40, 43 so that positions #4, #5, #6, of the read-in tape are read first, positions #1, #2, #3, on the next step, thereafter positions #4, #5, #6 again, and so on until reading of a group of five characters on the read-in tape (Western Union) has been completed. Since all the readings are transferred to three punch magnets, i.e., #1, #2, #3 of punch magnets 15, and since the read-out tape is fed one step for each read-in, each six digit parallel code or line of the read-in tape is translated to two sequential codes or lines of three digits each, on the read-out tape.

The #1 contacts of the banks 40, 43 are connected only to the normally open contact K1D*c* of switch K1D, and hence are ineffective when armature K1D*b* of switch K1D is in its up position (as illustrated) to complete circuits through punches #1, #2 and #3. The #1 contact of bank 37 is blank.

The punch magnet #4 is not used. The punch magnet #6 is connected to the #1 position of bank 45 and thence to line 19, while the punch magnet #5 is not connected to contact #1 of bank 45, but is connected only to the #12 contact of bank 45.

It follows that in the #1 position of the several switch banks only the #6 punch operates, and no code conversion takes place.

The contacts#1–#11, inclusive, of bank 45 are interconnected, so that the #6 punch operates for each of bank positions #1 to #11. As will appear, code conversion takes place for bank positions #2 to #11, so that ten codes or lines are read out, and following the code conversion operation, i.e., at bank position #12, the #5 punch is operated. This signals Finish of a word.

The structure and circuitry hereinabove described provides for the following operations at the read-out tape, for the specified longitudinal positions of the latter.

Position #1—Punch #6 only, signifying Start of a word.

Position #2–#11—Punch read-out information and punch #6 at each position.

Position #12—Punch #5 only, signifying Finish of a word.

The step switches of the system are actuated by a single step relay magnet 60 which is directly connected at one terminal to a B+ line 10 via line 61. The remaining terminal is connected via a cam operated switch 62 to B− terminal 63 via line 64. A thirteen position contact bank 65 is provided, having a wiper 66. Contacts #1 to #12 are blank and contact #13 is connected to the cold terminal of relay magnet 60, while wiper 66 is connected via line 67 directly to line 64, and thence to B− terminal 63.

The cam operated switch 62 is actuated by a cam 68, which is a punch cam, i.e., is on the same cam shaft as cam 30, and is operated by punch clutch 13. Cam 68 makes at 40° and breaks at 198° of its rotation. The step relay magnet 60 is, therefore, energized on each rotation of cam 68 until wiper 66 reaches contact #13, at which switch 62 is shorted by wiper 66. The transfer of the wiper contact 66 from contact #12 to contact #13 in itself generates a pulse for relay magnet 60 which transfers the wiper to contact #1, restarting the cycle, but since the transfer from contact #13 to contact #1 is not controlled by cam 68, no feed of read-out tape is involved, and the transfer is extremely rapid. Stepping of the bank 65 by step relay magnet 60 is synchronous with stepping of all the banks of the system. The system is therefore self-synchronized, the banks of relays being timed for each operation or step by the punch clutch 13, which in turn is actuated by the stepping of the switch banks.

It may be noted that the circuit of punch clutch 13 is closed thorugh switch 27, which is controlled by reader cam 31, and makes at 65° and breaks at 223° of its rotation. The punch clutch cannot be operated, therefore, while the reader clutch is in its 0° position, but can be energized when reader clutch 11 is in its 180° position.

A circuit is provided through the reader clutch 11 to a line 70, which in turn leads to two parallel circuits 71 and 72 via reader cam controlled switches 73 and 74 operated by reader cams 75 and 76, respectively. Cam 75 makes at 210° and breaks at 30°, while cam 76 makes at 80° and breaks at 210°. The line 71 proceeds to the #2 contact of a bank 77. The lead 72 proceeds to #1 contact of bank 77. Contacts #2 to #11 of bank 77 are connected together, and contact #12 is blank.

An On-Off switch S1B selects one of two contacts 81, 82, in the Off and On positions, respectively. Contact 81 is connected to a manual push-pull button switch S4B, and thence to a relay $K_1$ and to lead 16. It follows that relay $K_1$ may be energized with switch 81 in the Off position, when push-button switch S4B is closed. The movable arm of On-Off switch S1B is connected via leads 22 and 67 to B− lead 22.

A bank 86 of Finnish-The-Word contacts is provided, contacts #2 to #12 of which are interconnected, and connected to the On contact of switch S1A. The wiper of bank 86 is connected directly to the B— line 22, and contact #13 is unused. Contacts #2–#12, inclusive, of bank 86 are further connected by line 87 and via normally open switch K1A to one side of relay $K_1$. A normally open push-button switch S4A connects the #2 contact of bank 86 to B— line 22.

The wiper of bank 77 is connected via normally closed relay contacts K1B to B— line 22. The back contact K1D*c* of relay operated switch K1D is connected with the #1 contacts of banks 40 and 43, and with the wiper of another bank 90 of stepping switch contacts. The #6 and #7 contacts of the bank 90 are connected, respectively, in series with the #2 and #3 punches, and the remaining contacts of this bank are blank.

OPERATION

*Western Union Word #1*

Describing now the operation of the present system, we assume the various banks of contacts to be in position #1, and the reader pins to be at line #1 of a word on the read-in tape (Figure 1). The ganged Start-Stop switches S1A and S1B are placed in the On position. Reader cam operated switch 74 is then open, and 73 is closed so that the reader clutch magnet 11 is immediately energized. The latter is initially at 0°, and commences to rotate to 180° when energized.

As soon as reader cam 31 reaches 65° a circuit is completed from B+ lines 10 and 16, punch magnet #6, contact #11 of relay bank 45, to line 19. Punch cam 30 is at "time zero" of a cycle, closing switch 20, since punch cam 30 makes at 260° and breaks at 30°. With switch 20 closed, the circuit for punch magnet #6 is complete and a punch is made at longitudinal position #1, lateral position #6, of the read-out tape. This punch represents a Start character. No other punch magnet is, or can be, energized at position #1 of the stepping switches, since no #1 switch points other than that of bank 45 are connected.

The reader clutch is thereafter actuated 360° of rotation and the punch clutch is actuated 360° of rotation, for each input pulse to the clutches, during actual code read-out. At the start of a cycle of operation, or point of zero time, the reader clutch is at 0°. Since each of the clutches actuates its tape during the second 180° of its revolution, the read-in tape remains stationary during the initial 180° rotation of reader clutch 11, but thereafter feeds its tape on each actuation.

The cam 30 completes break of switch 20 at its 30° position, de-energizing punch clutch 11. A 40° cam 68 closes switch 62, transmitting a pulse to step relay magnet 60. The step relay advances all the contact banks to step #2.

A circuit is now available from B+ line 10, line 16, and in parallel to punch magnets #3, #2, #1, lines 41, 38, 35, the #2 contacts of banks 43, 40, 37, and reader switches #6, #5, #4, respectively. Those of punch magnets #1 #2, #3 are then energized which are in circuit with closed ones of reader switches #6, #5, #4. The circuit from reader switches #6, #5, #4 is completed via line 56, line 19, and switch 20 to the B— line 22. Punching, accordingly, occurs when switch 20 is closed, there being a current path through the punch clutch 13, the punch control bank 24, the closed cam switch 27, and lines 28 and 19 to the cam operated switch 20. After switch 20 opens, i.e., at 40° of rotation of cam 68, wiper 66 is stepped forward one step to position #3. In this position punch magnets #3, #2, #1 are placed in series with reader switches #3, #2, #1, respectively, instead of reader switches #6, #5, #4, and when switch 20 closes again the remaining half word of the read-in tape, at the first character thereof, is punched into the read-out tape.

It is important to note that the punch clutch 13 operates once for each of steps #1–#12 of the bank 65, and in turn controls the latter via cam 68, and cam operated switch 62.

In describing the operation of the present system, it has been assumed that the wipers of the several banks of stepping switches commence operation in position #1, and that switches S1A and S1B are actuated to On position so as to initiate operation.

The initial operation is to punch line #1, position #6 of the read-out tape. Punch magnet #6 is connected to the #1, position of bank 45. Power is supplied to punch magnet #6 via line 10, line 16, bank 45, wiper 46 and via switch 20 (now closed) to line 22 and the B— terminal. Switch 20 is closed since its cam 30 operates to close switch 20 from 260° to 30° of rotation of punch clutch 13, which is initially in 0° position.

It will be noted that punch #6 will be similarly actuated for each position of the switching banks except #12 and #13 and accordingly that the read-out tape will, when a word is complete, include punches at position #6 at lines #1 to #11, inclusive.

The reader cam 31 initially maintains open the switch 27, since the switch 27 makes at 65° and breaks at 223° of rotation of cam 31, and since the reader clutch 11 commences its operation at 0° of rotation. A circuit is thus closed for punch clutch 13, from B+ line 10, to line 23, switch bank 24, wiper 25, switch 27, line 19, switch 20, line 22 and the B— terminal. The punch clutch rotates 360° in response to current applied thereto, actuating each of the several punch cams through a cycle. The punch clutch is arranged to effect feed of the read-out tape late in its cycle, to give the punches 15 time to operate before the tape is fed.

Switch 20 breaks at 30° of rotation. Switch 62 makes at 40° effecting transfer of the wipers of the several stepping switches to position #2. Switch 62 breaks at 198°.

With wipers 36, 39, 42 in position #2, the reader pins #6, #5, #4 are connected in circuit and read the values of positions #6, #5, #4, line 1, of the read-in tape, energizing appropriate ones of punches #3, #2, #1, respectively, accordingly as holes appears at the #6, #5, #4, positions of the read-in tape. Tracing the circuit for punch #3, as exemplary, and starting at B+ line 10, proceed to line 10, line 16, punch magnet #3, line 41, wiper 42, position #2 of switch bank 43, line 52, #6 reader pin, line 56, line 19, switch 20, line 22, B— terminal. The circuit is then completed.

The circuit of punch clutch 13 has been previously traced, and is closed as soon as wiper 25 attains #2 position. Hence, line 2 of the read-out tape is punched and the read-out tape thereafter fed one step.

At 30° rotation of the punch clutch 13, switch 20 is opened, disabling the energizing circuit of the punch clutch. The latter nevertheless completes its cycle. At 40° of rotation of the punch clutch 13 step relay magnet 60 is again energized via switch 62, and the several banks of stepping switches advance to position #3. The circuit of step relay magnet 60 breaks at 198° and at 260° switch 20 again closes.

A circuit is now again completed for punch clutch 13 and for the punch magnets #3, #2, #1. However, the stepping switch banks 43, 40, 37 being now in #3 position, the reader switches #3, #2, #1 are in circuit and read the second half of the read-in tape, at line 1. The read-out operation at line #3 of the read-out tape completes immediately.

The reader clutch 11 is now energized via a circuit traced from B+ line 10, contact 3 of bank 17, wiper 18, K1D switch, line 19, switch 20 to B— line 22. The reader clutch now proceeds to rotate from 180° to 0°, it being recalled that read-in of Western Union Word #1 was initiated with reader clutch 11 at 180°. Reader cam 31 moves to break position at 223°, and breaks the circuit to punch clutch 13. However, prior to this event, and at 210°, cam 75 makes switch 73, which completes a circuit for reader clutch 11 via line 71, switch bank 77, switch K1B, line 22 and B—. The reader clutch 11, accordingly, rotates to 180°.

During the latter part of the revolution of reader clutch 11, the read-in tape feeds one place to line #2, and the switch 27 makes. On closure of switch 27 a circuit is again completed for punch clutch 13 via bank 24 and switch 27.

WESTERN UNION LINE #2

The punch clutch rotates, closes switch 62 at 40° and effects a further step of the several stepping switches, which now advance to position #4.

At position #4 all circuits to reader clutch 11 are open, since position #4 of reader control bank 17 is blank, and since switch 73 is open at 180°.

The banks 43, 40, 37, at position #4, provide circuits between #6, #5 and #4 reader switches and the punch magnets #3, #2 and #1, respectively. The #6, #5, #4 positions of line 2 of the read-in tape are read and the corresponding code elements punched into the read-out tape at position #4. Cam 30 breaks at 30° but the punch clutch 13, having once been energized, completes its revolution, making switch 20 at 260°, so that the punch clutch 13 then is energized for a succeeding revolution, stepping the switch banks to position #5. At the latter position of the stepping switch bank positions the remaining half, i.e., positions #3, #2, #1 of line 2 of the read-in tape is read.

The cycle of operation as described continues until eleven (11) switch bank positions have been completed, when reading of a Western Union Word is complete. The stepping switches then proceed to position #12, at which is to be punched a character consisting of a read-out at #5 position, i.e., a Finish signal.

The banks 90, 43, 40, 37 are blank at the #12 position, so that code conversion cannot occur. Bank 45 connects the #5 punch magnet to line 19, so that the Finish punch is made. The #6 punch magnet is disconnected.

Following punching of the Finish code by punch #5, and on rotation of cam 68, the step magnet relay 60 is energized and brings the banks of contacts to their #13 position. In this position the step relay magnet 60 receives a further pulse, in a circuit which by-passes switch 62, proceeding from contact #13 of bank 65, to wiper 66, lead 67, lead 64 and to B− terminal 63. Accordingly, as soon as the banks attain position #13 they step once more to position #1, without waiting for a revolution of the punch cam 68. Having arrived at position #1 the overall cycle is again initiated by generation of a Start punch in the read-out tape.

FINISH-THE-WORD OPERATION

When the power switches S1A and S1B are thrown to Off condition during a cycle of the system, it is likely that the system will be in process of reading out a word. It is, however, desirable that any cycle of the system, once started, be completed. Completion is accomplished by banks 77 and 86, which are therefore called "finish-the-word" banks.

Once the system has initiated operation, and arrived at contacts #2 of the stepping switch banks, the Off switch S1A is shunted by bank 86, through position #12 thereof, since contacts #2–#12 of bank 86 are all connected to one side of switch S1A and the wiper of bank 86 is connected to the other side of switch S1A. Line 19 is accordingly energized whenever switch 20 is closed by punch cam 30.

Similarly, contacts #2 through #11 of bank 77 are connected together, and to switch 73, while contact 12 is connected to switch 74. Switch 73 is actuated by reader cam 75, which makes the switch at 210° and breaks the switch 73 at 30°. Switch 74 is controlled by reader cam 76 which makes the switch at 80° and breaks the switch at 210°. The wiper of bank 77 is connected to B− line 22 via normally closed switch K1B.

Reader clutch 11 is at 0° at the commencement of a cycle of operations. When switches S1A, S1B are closed a circuit is made for the reader clutch 11 through switch 73, and the reader clutch rotates to 180°, breaking its own circuit in the process at switch 73. Since the reader clutch feeds tape between 180° and 0°, the read-in tape is stationary, ready for read-in of line #1. At 65° of rotation of reader clutch 11 switch 27 is closed, making a circuit via switch 20, now closed, for punch clutch 13. The first line is then punched, and the read-out tape fed one step. The stepping switch banks are fed to position #2 in response to closure of switch 62 during rotation of the punch clutch. This process causes another pulse to be delivered to the punch clutch, which rotates. The first half of line #1 of the read-in tape is then read. Rotation of the punch clutch causes the stepping switches to step to position #3, where the second half of line #1 of the read-in tape is read. It is at this point that the reader clutch is energized via wiper 18, and transfers to 0°, feeding read-in tape in the process.

The reader clutch circuit proceeds through switch S1A to B− line 22 if S1A is closed. If it is open the circuit proceeds through bank 86, so long as bank position #1 has been passed. The same is true of punch clutch 13.

The reader clutch 11, then, rotates to 180° on its first impulse, stays there until the stepping banks attain position #3, then rotates to 0°. The process involved is as follows. When the wiper 18 touches contact #3 initially the reader clutch 11 starts to rotate, starting from 180°. Reader cam switch 75 is then open, and punch cam 30 has closed switch 20.

At 210° switch cam 75 closes switch 73, again energizing the reader clutch, so that it proceeds to 180°, instead of to 0°. Hence, cam 75 and switch 73 are required to assure 360° rotation of 180° clutch 11.

Reader cam 76 and switch 74 are used only to bring reader clutch 11 to 0° at the end of a cycle of read-out of one Datatron word. At position #11 of the banks the reader clutch 11 is at 180°. The reader clutch 11 must advance the read-in tape to the sixth position and come to rest with the clutch at zero. It is recalled that tape advance occurs between 180° and 360°. The stepping switch banks now proceed to position #12 (which completes a circuit through switch 74 now closed) to the wiper of bank 77. The one pulse so generated brings the reader clutch back to zero, while disabling the circuit of switch 73.

The switch 73, then, brings the reader clutch 11 from 0° to 180°, while the switch 74 brings the reader clutch 11 from 180° to 0° after the fifth line of the read-in tape T1.

The function of bank 86 is to provide a circuit around switch S1A between positions #2 and #12 of the switch banks, so that opening of switch S1A, once the bank wiper of bank 86 has passed to point #2 of bank 86, has no effect on the circuit. Accordingly, one read-out of a word has been initiated by a "start" punch made on the read-out tape, and the punch clutch rotates to 40°, permitting switch 62 to close, the word currently being converted will be completed.

SPECIAL WORD INSERTION

Provision is also made for punching of a "special word" in the read-out tape. The "special word" may have a variety of purposes and characters, according to the use which is made of the system. In the presently contemplated use of the present system the Datatron coded material is to be fed to a computer, and in such case the "special word" is employed for computer control.

The "special word" contemplated consists of punches on the #1 to #11 lines, at #6 lateral position, a punch at the #12 line, at #5 lateral position, punches at #1 line, lateral positions #2 and #3, and punch at #6, line, position #2, and a punch at #7 line, position #1. (See Figure 4.)

The special word may be read into the read-out tape, by closing the manual switch S4B and S4A momentarily, and thereby energizing the relay K1 and shorting across the on-off switches S1A, S1B. Energization of relay K1 effects closure of switches K1A, K1B, K1C and actuation of armature K1D*b* to its forward position. Closure of switch S4B is accompanied by closure of switch S4A and is effective only if switches S1A, S1B and in Off position, since when switch S1B is On lead 82 is not connected to B− lead 22.

When switch S4B is depressed relay K1 is energized (S1B being in Off position), while switch S4A connects B− lead 22 to one side of switch 20.

The reader clutch is disconnected when armature K1D*b* is down, since reader control bank 17 is then disconnected from lead 19. Switch K1B opens and hence disconnects the wiper of bank 77 from B− line 22. This effectively disables reader cam controlled switches 73, 74.

Closure of contacts K1D*b*, K1D*c* eliminates reader controlled switch 27, the punch clutch current now proceeding through line 23, and punch control bank 24, and bank to line 19 via conatct K1C, instead of via switch 27.

Armature K1D*b*, in its "down position," connects contacts #1 of banks 40, 43 to line 19. These contacts serve to energize punches #2 and #3, respectively. Punch #6 is connected to line 19 via bank 45.

The first operation which occurs is then the energization of punch clutch 13, and the punching of a character consisting of elements at lateral positions #2, #3, #6, in line #1 of the read-out tape, read-out tape feed, and actuation of all stepping switch banks to position #2.

Bank 45 energizes punch #6 for positions #1–#11, and punch #5 for position #12 of the bank, precisely as in a code conversion operation, since this bank is divorced from any read-in.

At positions #2–#12 a holding circuit is completed for relay magnet K1 through bank 86, line 87 and relay contacts K1A, and this holding circuit by-passes switch S4B. It follows that once switch S4A has been momentarily closed across the on-off switch S1A, and a special word cycle initiated, the cycle will be completed.

Bank 90 has contacts #6 and #7 connected respectively to punch magnets #2 and #1, the circuits being completed via the wiper of bank 90, armature K1D*b* and contact K1D*c*. There is thus included provision for punching lines #6 and #7 of the read-out tape.

When position #13 of the stepping switch banks has been attained the holding circuit for relay coil K, is broken at contact #13 of bank 86, and the various contacts K1A to K1D return to unactuated condition, and the system to read-in condition.

EQUIPMENT ORGANIZATION

In a practical embodiment of the present system, a separate tape reader unit and a separate tape punch unit may be employed, and they may be of conventional character per se. The tape reader and the tape punch may be controlled from a converter unit, which serves to receive code signals from the tape reader unit, and to transmit code signals to the tape punch unit, via cables. These same cables serve to interchange synchronizing or timing signals among the several units, and to provide power thereto.

Figure 4:
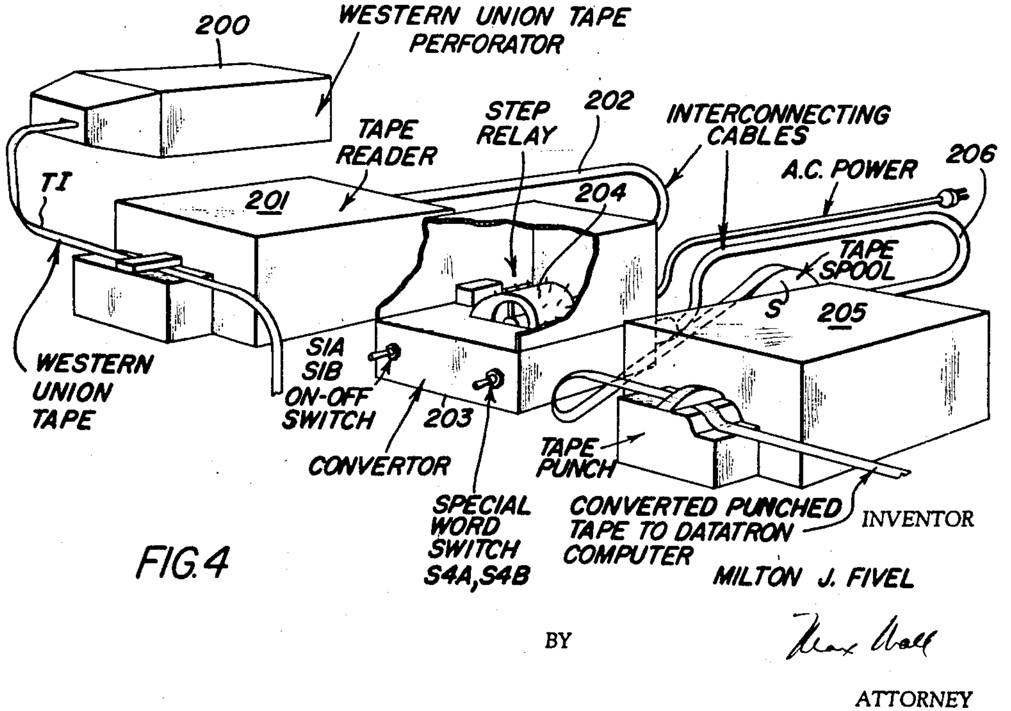
Figure 4 is a block diagram of a system according to the invention.

Referring now to Figure 4 of the accompanying drawings, the reference numeral 200 denotes a conventional Western Union tape perforator, which inserts Western Union coded information in a read-in tape TI. The Western Union tape perforator may receive its information by wire from remote points in conventional fashion. The punched tape TI is fed into a tape reader, 201, which includes a set of sensing switches, for sensing the indicia punched into the tape TI. These correspond with switches RS, in Figure 5 of the accompanying drawings. The tape reader 201 also includes the reader clutch 11, and mechanism for feeding the tape TI in response to rotations of the reader clutch 11. The tape reader 201 also includes the several reader cams 31, 75, 76, and the several reader cam operated switches 27, 73, 74, which are added to the commercial unit for operation in the system of the present invention. A cable 202 interconnects the tape reader 201 with a converter unit 203. The latter receives from the tape reader 201, via cable 202, information signals and control signals from the switches 27, 73, 74, and transmits to the reader 201, and specifically to the reader clutch 11 thereof, timed actuating signals.

The converter 203 includes the On-Off switch S1A, S1B and the "special word" switch S4A, S4B, so that the complete and entire operation of the tape reader may be controlled from the converter 203. The converter includes all the switch banks of the system, collectively identified by the numeral 204, and the "special word" relay K1.

The output of the converter 203 is supplied to a tape punch 205, via a cable 206, and this output includes actuating signals for the punch clutch 13 (Figure 5) and for the punch magnets 15. The tape punch unit 205 is essentially a conventional, commercial unit, but has been modified by inclusion of punch cams 30, 68, and punch cam operated switches 20 and 62, which supply timing signals to the converter 203 via cable 206. Operating power is also supplied to the tape reader 201 and the tape punch 205 from the converter 203, via cables 202 and 206, so that the single On-Off switch S1A, S1B or "special word" switch S4A, S4B, may control the entire system. Thereby, the tape 205 punch may be located remotely of the converter 203, and the tape reader 201 may likewise be located remotely of the converter 203 and the tape punch 205.

TIMING DIAGRAM

Figure 6B:
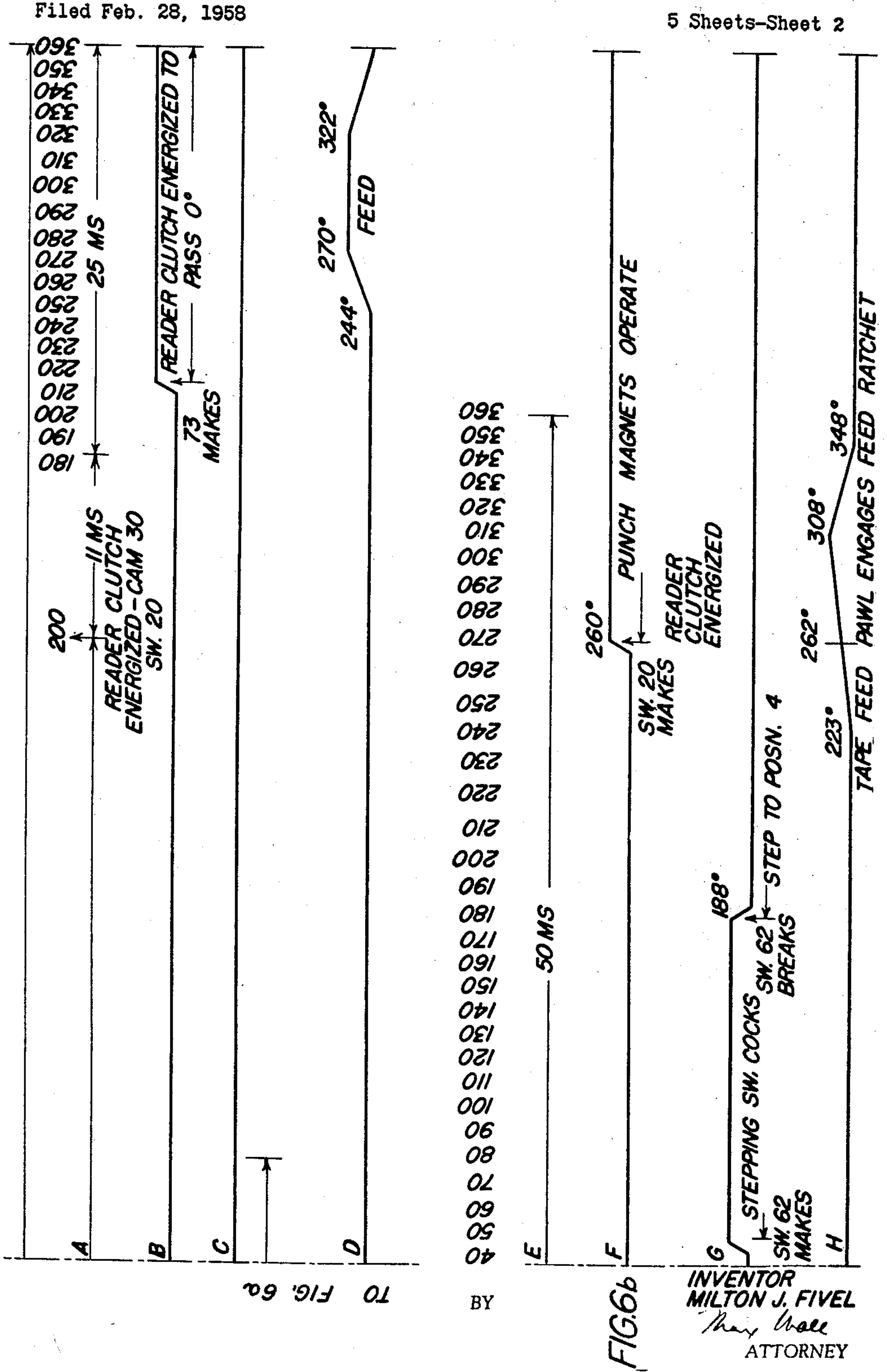
Figures 6*a* and 6*b* are timing diagrams, useful in explaining the operation of the system.
Figure 6A:
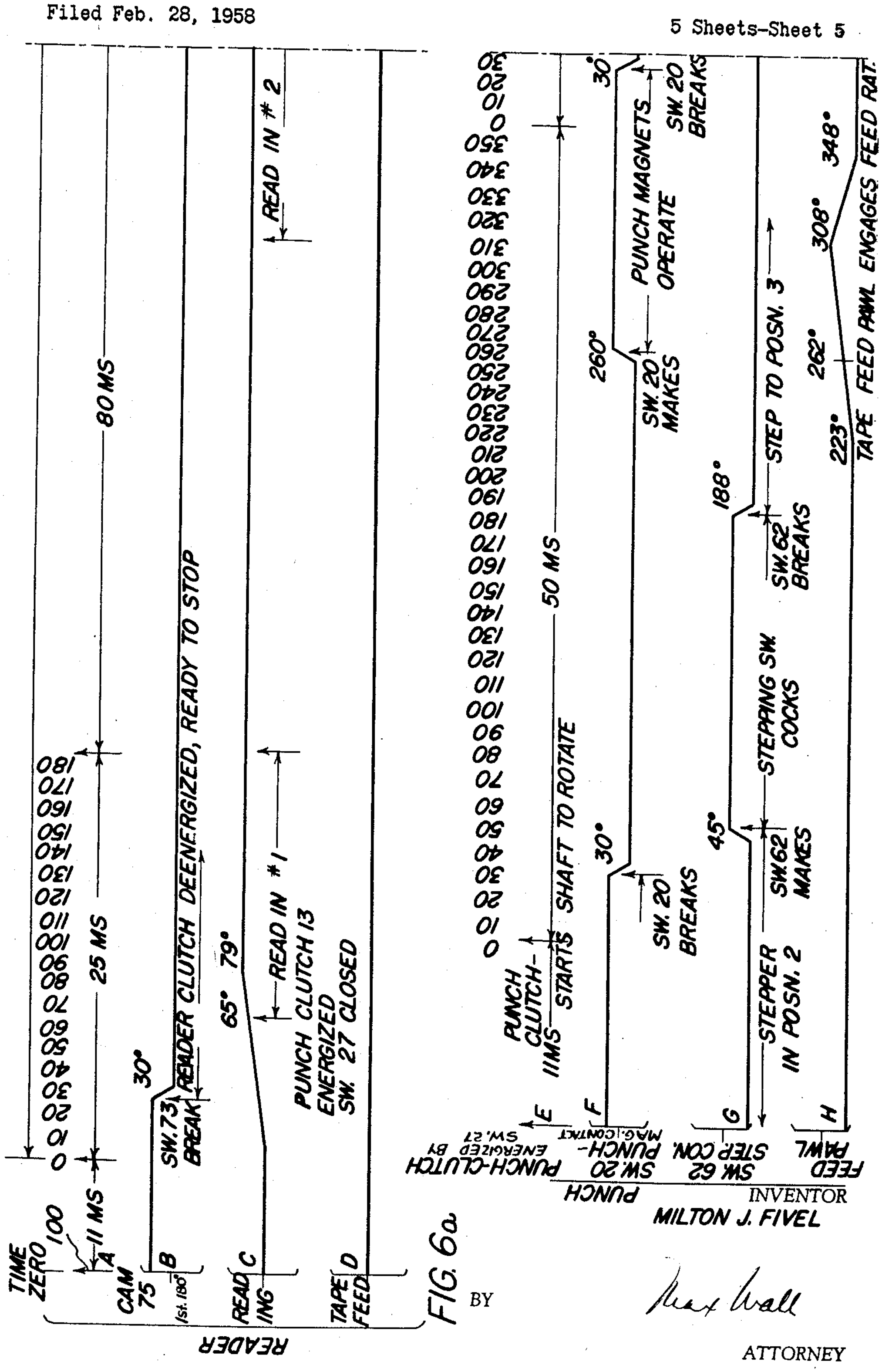

The operation of the present system may be further clarified by reference to the timing diagram of Figures 6*a* and 6*b* of the accompanying drawings.

In 6*a* is shown certain time relations pertaining to the read-in function of the present system.

Assuming that the switch S1A, S1B is closed at time zero, i.e., at 100, line A of Figure 6*a*, about 11 milli-seconds (ms.) are consumed in initiating rotation of the reader clutch 11, due to its own inertia. The reader clutch 11 then rotates through 180° and rests until the Start punch and the first line of Western Union code has been read-out. The rotation requires 25 ms., and the rest period 80 ms.

The reader clutch controlled switch 73 breaks at 30°, but the reader clutch 11, once pulse energized completes its cycle, coming to rest at 180° of rotation. Switch 27 makes at 65° and breaks at 223°, so that a circuit for the punch clutch 13 is completed at 65° of rotation of the reader clutch (line C). Between 65° and 180° of rotation of the reader clutch 11 the first half line is taken from the read-in tape and transferred to the read-out tape.

The punch clutch requires about 11 milli-seconds from its energization time to commence rotation (line E), and each rotation is of 360°. Switch 20 breaks at 30° of rotation of punch clutch 11 (line F), but the punch clutch, once it is pulse energized, completes its rotation. Switch 20 closes at 260° permitting the punch magnets to be energized, and reading in the second half of the first line of Western Union code. The punch clutch 13 resets its circuit at 260° of its rotation, so that no pause occurs between its first and second revolution (line E).

The stepping switch magnet 60 is energized at 40° of rotation of punch clutch 13 (line G). Its operation is such that on energization it cocks, and on deenergization it steps the banks of stepping switches. Stepping to position #3 commences, then, at 188° of rotation of the punch clutch 13.

The punch clutch controls feed of the read-out tape the actual mechanism involving a pawl and ratchet, of conventional character per se, the feed time being at approximately 308°.

The second rotation of the punch clutch duplicates the first (see Figure 6*b*).

The second 180° of rotation of the reader clutch (line A, Figure 6*b*) completes its revolution. Initiation of its second 180° of operation commences at 260° of rotation of the punch clutch 13 when switch 20 makes. After 11 milli-seconds the reader clutch 11 rotates. Rotation of reader clutch 11 to 210° closes switch 73 (line B) which remains closed to 30° of rotation, thereby permitting the reader clutch 11 to pass 0° of rotation, and to proceed again to its 180° position. At 30° the switch 73 opens, so that completion of rotation of the reader clutch to its 180° position is due to inertia.

Line D shows the tape feed time of the read-in tape, between 244° and 360° of rotation of the reader clutch 11.

The circuit of the punch magnets 15 is closed at switch 20, on 260° of rotation of the punch clutch 13 (line F), the stepping switch 62 making at 40°, and breaking at 188°. The relay 60 (line G) cocks the stepping switches at 40°, and steps same at 188°, to their succeeding position (#4). The read-out tape is fed at about 308°, as in the preceding cycle (line H).

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for conversion of a word on a six unit coded read-in tape to a word on a three letter coded read-out tape, comprising six sensing elements for sensing a line of the six unit code, insert means for inserting a three letter code on said read-out tape, means for actuating said insert means initially in response to three of said six sensing elements, means for thereafter actuating said insert means in response to the remaining ones of said six sensing elements, and tape feed device for stepwise feeding said read-out tape intermediate operations of said two last-mentioned means.

2. The combination according to claim 1, wherein is provided a start-stop switch, means for initiating automatic sequential read-in of words of said six unit coded read-in tape, means whereby said means for initiating is made responsive to closure of said start-stop switch, and means for effecting completion of read-in of said any one of said words, and means whereby said means for effecting is made responsive to opening of said start-stop switch during read-in of any one of said words.

3. The combination according to claim 2, wherein is further provided means including a switch shunting said start-stop switch for inserting a special word into said read-out tape in response to transient actuation of said switch.

4. In a system for converting $m$ digit coded words into $n$ digit coded words, where $2n=m$, comprising means time sequentially converting alternate halves of said $m$ digit coded words to $n$ electrical signals, $n$ punches, and means for actuating said $n$ punches in response to said $n$ electrical signals.

5. The combination according to claim 4, wherein is provided a stepping switch unit having at least one position for each line of said $n$ digit coded words, and means for controlling the operation of said means for converting so that alternate halves of each line of said $m$ digit words are converted in sequence, and means whereby said means for controlling is made responsive to said stepping switch unit.

6. The combination according to claim 5, wherein is included an $m$ position read-in sensing device, $n$ banks of stepping switches in said stepping switch unit, and means comprising said n banks of stepping switches for connecting alternate halves of said $m$ position read-in sensing device to said $n$ punches for alternate positions of said $n$ bank of stepping switches.

7. A system for converting five six digit characters into ten three digit characters, comprising six means for sensing said characters in succession by sensing the digits of any character simultaneously, three punches, and means for actuating said punches at successive times in response to alternate halves of each of said six digit characters in response to said means for sensing.

8. The combination according to claim 7, wherein is provided three banks of stepping switches each having plural contacts and a wiper, one for each of said three punches, means for connecting three of said six means for sensing to even numbered contacts of said three banks of stepping switches, one for one, means for connecting the remaining three of said six means for sensing to odd numbered contacts of said three banks of stepping switches, one for one, means for connecting the wipers of said three banks of stepping switches respectively to said three punches, one for one, and means for stepping said three banks of stepping switches through a cycle of operation wherein said wipers contact said contacts in sequence.

9. The combination according to claim 8, wherein is provided means for enforcing completion of said cycle of operations once said cycle of operation has been initiated.

10. The combination according to claim 9, wherein is further provided means for controlling said punches to punch a special word, said last means including further banks of stepping switches interconnected to each other and to said punches to generate said special word in response to stepping of said further banks of stepping switches through a complete cycle.

11. A tape reader comprising a reader clutch arranged to rotate 180° per discrete energization, a stepping switch arranged to advance one step for each energization thereof, means for supplying sequential energizing current pulses to said stepping switch, a control switch having multiple contacts and a wiper, means for effecting a relative step-wise advance of said contacts and said wiper for each advance of one step of said stepping switch, means connecting said reader clutch to selected ones only of said multiple contacts, and means for supplying energizing current to said reader clutch via said selected ones only of said multiple contacts.

12. In a code converter for converting six digit codes on a read-in tape to three digit codes on a read-out tape, a start-stop switch, a reader clutch, a punch clutch, reader sensing switches for sensing simultaneously the six digits of the read-in code, a plurality of punch magnets for controlling punching of the read-out tape, said reader clutch arranged to rotate 180° per discrete energization and to feed said read-in tape step-wise during each 180° to 360° of rotation of said reader clutch, said punch clutch arranged to rotate 360° of rotation of each discrete energization thereof, said reader and punch clutches having start positions at 0°, means for energizing said reader clutch in response to closure of said start-stop switch, whereby said reader clutch rotates to 180°, means to energize said punch clutch in response to rotation of said reader clutch between 0° and 180°, whereby said punch clutch rotates, means for energizing selected ones of said punch magnets in response to rotation of said punch clutch, selection being accomplished in accordance with sensing by the first three of said sensing switches, a plurality of step switches, means for stepping said step switches one step in response to each rotation of said punch clutch, means for effecting further energization of said punch clutch in response to said stepping of said step switches one step, means for energizing selected ones of said punch magnets in response to said further energization of said punch clutch, selection being accomplished in accordance with sensing by the remaining three of said sensing switches.

13. In a code converter for converting six digit codes on a read-in tape to three digit codes on a read-out tape, a start-stop switch, a rotatable reader clutch arranged to rotate 180° per discontinuous energization, a punch clutch arranged to rotate 360° per discontinuous energization, means for actuating said read-in tape one step in response to rotation of said reader clutch from 180° to 360°, means for actuating said read-out tape one step in response to rotation of said punch clutch from 180° to 360°, a stepping switch, means for actuating said stepping switch one step for each revolution of said punch clutch, means for energizing said punch clutch only during 0° to 180° of rotation of said reader clutch, means for energizing said reader clutch only during 180° to 360° of rotation of said punch clutch, and means comprising said stepping switch for controlling the discontinuous energizations of said reader clutch in a predetermined time pattern.

References Cited in the file of this patent

UNITED STATES PATENTS

| | | |
|---|---|---|
| 2,620,878 | Rabenda | Dec. 9, 1952 |
| 2,633,491 | Zentgraf | Mar. 31, 1953 |
| 2,847,503 | Diamond et al. | Aug. 12, 1958 |